March 21, 1939. P. WOITYNEK 2,151,413
TRIMMER
Filed July 22, 1936 3 Sheets-Sheet 3
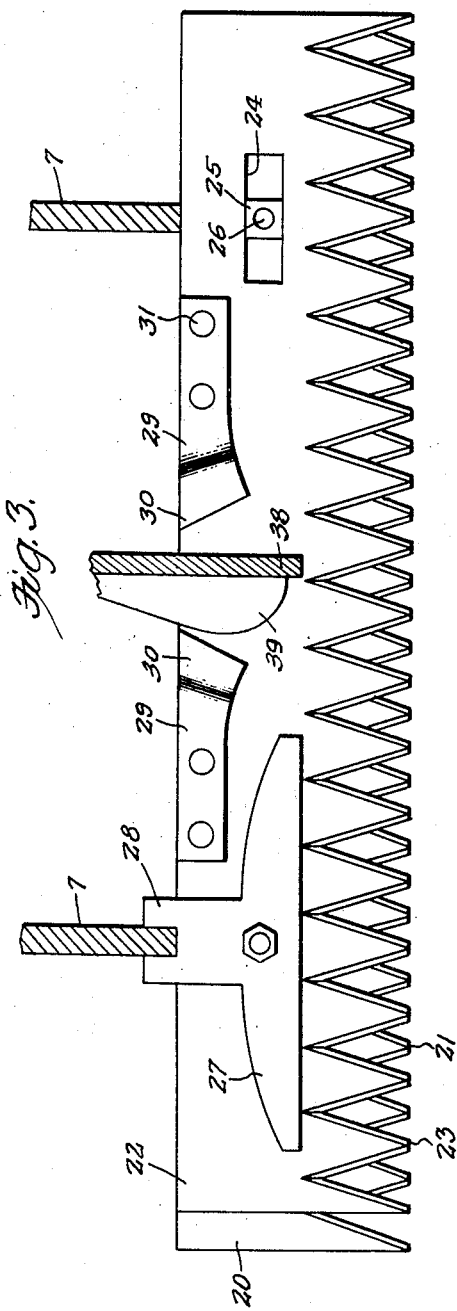
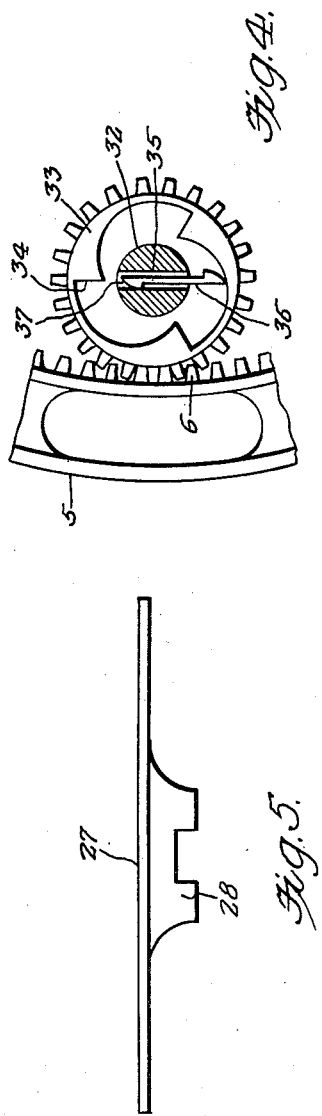
Inventor
Paul Woitynek,
By Clarence A. O'Brien
Hyman Berman
Attorneys Patented Mar. 21, 1939

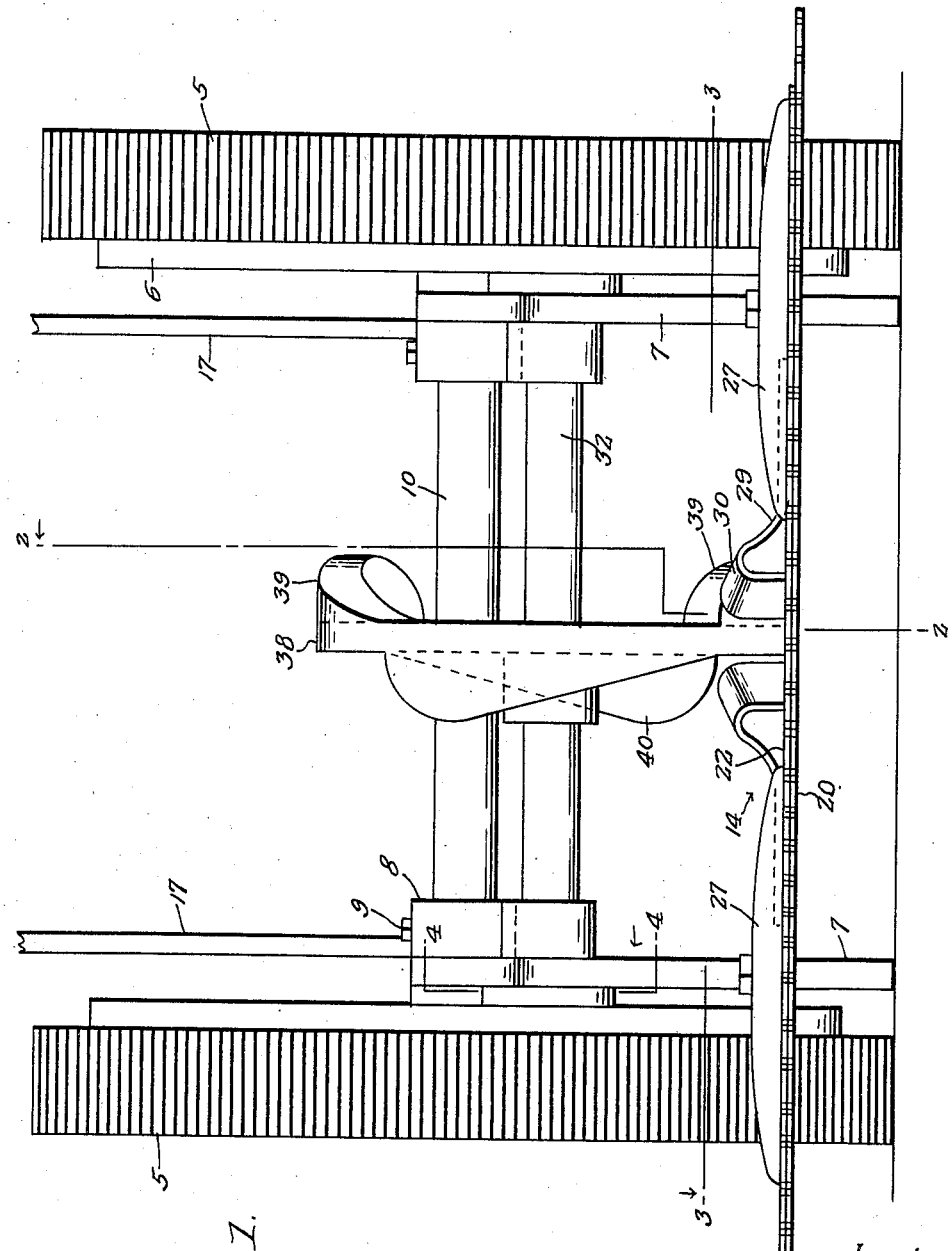

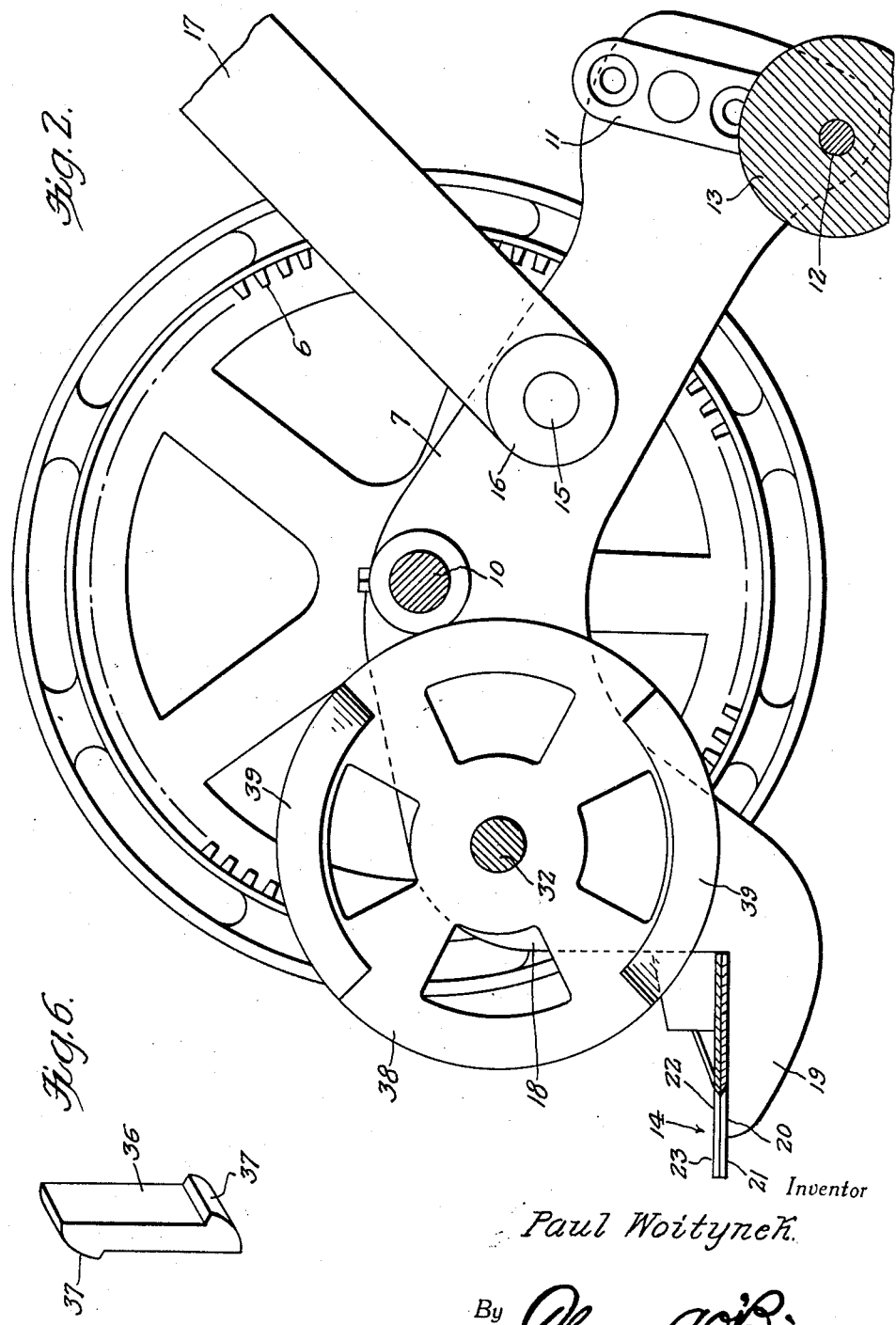

2,151,413

UNITED STATES PATENT OFFICE 2,151,413

TRIMMER

Paul Woitynek, Peoria, Ill.

Application July 22, 1936, Serial No. 92,020

1 Claim. (Cl. 56—262)

This invention appertains to new and useful improvements in lawn mowers, and more particularly to a novel trimmer for trimming the edge portions of lawns and around shrubbery.

The principal object of the present invention is to provide a machine of the character stated which is of light weight and capable of being handled in a limited space.

Another important object of the invention is to provide a lawn trimmer wherein the cutting element is of the sickle type and projects laterally of the ground engaging wheels, to the end that the cutting action is transversely and laterally of the machine.

These and various other important objects of the invention will become apparent to the reader of the following specification.

In the drawings:

Figure 1 represents a front elevational view of the machine;

Figure 2 is a vertical sectional view taken substantially on line 2—2 of Figure 1;

Figure 3 is a horizontal sectional view taken substantially on line 3—3 of Figure 1, with parts removed;

Figure 4 is a fragmentary vertical sectional view taken substantially on line 4—4 of Figure 1;

Figure 5 is a front edge elevational view of one of the movable leg guides;

Figure 6 is a perspective view of one of the slidable pawls.

Referring to the drawings, wherein like numerals designate like parts, it can be seen that numerals 5—5 represent the ground engaging wheels, each of which is provided with the internal ring gear 6.

A pair of mechanism supporting side members 7—7 are provided, and each is provided with a laterally extending collar 8 having a set screw 9 therein for engagement against the axle 10, which axle extends through the supporting members 7—7 and collars 8 and have the wheels 5—5 on the ends thereof.

Vertically adjustable members 11 are provided on the rear ends of the supporting members 7 and have openings therein for receiving the ends of the rod 12 on which the ground engaging roller 13 is mounted. Obviously, the roller 13 can be adjusted with respect to the rear ends of the supporting members 7 to regulate the height of the cutter generally referred to by numeral 14 with respect to the ground.

Studs 15 are provided on the inner sides of the supporting members 7 for engagement with the collars 16 at the lower ends of the fork 17 from which a handle (not shown) extends.

The forward ends of the supporting members 7 depend as at 18 and extend forwardly as at 19 on a transverse line forwardly of the wheels 5—5 and upon these forwardly extending portions 19 is secured the stationary cutter plate 20 having the usual sickle teeth 21.

Transversely slidable above the portions 19 of the supporting members and upon the cutter plate 20 is the reciprocatory cutter plate 22, also provided with sickle teeth 23. The cutter plate 22 is provided with longitudinally extending slots 24 therein into which extend the polygonal-shaped protuberances 25 rising from the cutter plate 20. Each of these protuberances 25 is provided with a threaded bore 26 therein into which a screw can be disposed for securing the corresponding guide 27 in place on the slidable plate 22. Each of these guides is of substantially T-shape, having the wide portion inclined and bearing against the cutter plate 22, as shown in Figures 2 and 3, with the rear shank portion 28 bifurcated to receive the corresponding depending portion 18 of one of the supporting members 7.

Upon the rear edge portion of the cutter plate 22 are the blocks 29—29 which are provided with rearwardly converging head portions 30—30. Each of these blocks or abutments 29 is riveted as at 31 to the cutter plate 22.

Transversely disposed and journaled through the side supporting members 7 is the shaft 32, the ends of which have the pinions 33 rotatable thereon. Each of these pinions 33 is of hollow construction and formed internally with the ratchet formation 34. Each end of the shaft 32 at a point within the corresponding pinion 33 is formed with a transversely extending opening 35 through which the pawl member 36 is free to slide. Each end of the pawl member 36 is provided with a beveled head 37. Obviously, when the wheels 7 are rotated in one direction, a connection will not be established between the shaft 32 and the pinions by the pawls 36. However, when the wheels 5 are rotated in a forward direction for cutting action, the pins engage the ratchet formations 34 and in this manner motion is imparted to the shaft 32.

A wheel 38 is secured to the intermediate portion of the shaft 32 and this wheel is provided on one side at diametrically points with the cam formations 39—39 and at its opposite side at diametrically opposite points and at 90° removed points from the cams 39—39 with cams 40—40. As is clearly shown in Figures 1 and 2, the peripheral portion of the wheel 38 operates between the heads 30 of the abutments 29—29 and as the cam on one side of the wheel moves against one of the heads 30, the blade 22 is shifted in that direction and as the next cam on the opposite side of the wheel rides against the complementary abutment head 30, the blade 22 is shifted in the opposite direction.

As is clearly shown in Figure 1, the cutting plates 20—22 project laterally of the drive wheels 5—5.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

The improved lawn mower described comprising essentially a frame having spaced parallel forward extensions, ground wheels connected with the frame and having internal gears, cutting means including a stationary cutting plate supported on said extension, a reciprocatory cutting plate, means for securing the same on the stationary cutting plate supported in front of the lower portions of the wheels, a pair of blocks fixed to the upper side of the said reciprocatory cutting plate adjacent its rear edge, heads on the inner ends of said blocks having rounded upper portions and also having spaced, opposed, and rearwardly converged sides, a transverse shaft journaled in the forward portion of the frame, a wheel fixed on said shaft and movable between the opposed sides of the heads on said blocks and having cams at its opposite sides, and pinions on said shaft and meshed with said internal gears of the ground wheels and connected by ratchet means with the shaft.

PAUL WOITYNEK.